United States Patent [19]

Needham

[11] Patent Number: 4,466,748

[45] Date of Patent: Aug. 21, 1984

[54] THERMAL IMAGING APPARATUS

[75] Inventor: Martin J. Needham, Charlwood, England

[73] Assignee: U.S. Philips Corporation, New York, N.Y.

[21] Appl. No.: 383,442

[22] Filed: Jun. 1, 1982

[30] Foreign Application Priority Data

Jun. 5, 1981 [GB] United Kingdom ................. 8117256

[51] Int. Cl.³ ............................ G01J 5/52; G01J 5/54
[52] U.S. Cl. .................................. 374/129; 250/353; 350/6.7; 356/46
[58] Field of Search .................... 374/129, 124, 2, 130; 350/6.7, 538; 250/351, 353; 356/46, 49

[56] References Cited

U.S. PATENT DOCUMENTS

| 3,407,302 | 10/1968 | Bouwers | 350/538 |
|---|---|---|---|
| 3,588,497 | 6/1971 | Jordan | 250/351 X |
| 3,611,806 | 10/1971 | Hishikari | 374/129 |
| 3,626,091 | 12/1971 | Casper | 350/6.8 X |
| 3,722,282 | 3/1973 | Loy | 356/46 X |
| 3,863,502 | 2/1975 | Elliott | 374/104 |
| 3,880,522 | 4/1975 | Murray | 356/46 |
| 4,140,903 | 2/1979 | Clark | 350/6.7 X |
| 4,260,217 | 4/1981 | Traeger et al. | 350/538 X |
| 4,268,110 | 5/1981 | Ford | 350/6.7 |
| 4,349,843 | 9/1982 | Laakmann et al. | 250/353 X |
| 4,365,307 | 12/1982 | Tatsuwaki et al. | 374/124 X |

FOREIGN PATENT DOCUMENTS

| 0051894 | 5/1982 | European Pat. Off. . |
| 0052395 | 6/1982 | European Pat. Off. . |
| 1442195 | 7/1976 | United Kingdom . |
| 1530066 | 10/1978 | United Kingdom . |

OTHER PUBLICATIONS

Mullard Technical Note, No. 79, (TP 1664), 3/1978.

*Primary Examiner*—Daniel M. Yasich
*Attorney, Agent, or Firm*—Marc D. Schechter

[57] ABSTRACT

The radiometric measurement of the temperature of remote targets is usually done with a radiometer having a detector whose field of view is alternately switched between the target and a reference temperature source. The detector output is then used to change the reference source temperature to equal the target temperature. According to the invention the reference source temperature is not changed by the measuring apparatus. The difference in detector signals obtained from the target and reference source is used to calculate the target temperature from the known laws of thermal radiation and the known detectivity and spectral response of the detector. The invention can be incorporated in thermal imaging apparatus using the radiation detector scanned to form the thermal image as the radiometer detector. In such radiometric thermal imaging apparatus an array of detectors is scanned across the scene in a raster and a corresponding visual raster is produced. The output of one of the detectors is sampled at a point in the raster which is identified in the visual raster and which is aligned with the target. The output is also sampled when the detector is receiving radiation from the reference temperature source at a point between scans. The difference signal between these two samples is applied to a microprocessor, together with the reference source temperature, an estimate of target emissivity and the detector parameters. From these inputs the microprocessor is programmed to calculate the target temperature.

14 Claims, 3 Drawing Figures

THERMAL IMAGING APPARATUS

BACKGROUND OF THE INVENTION

This invention relates to apparatus for the radiometric measurement of the temperature of a target. Particularly, but not exclusively, it relates to radiometric apparatus incorporated in thermal imaging apparatus. The thermal imaging apparatus comprises a scanner for repetitively scanning a thermal radiation detector across the scene in a raster, reconstruction means for producing a visible version of the scene by synchronously scanning a light source across the field of view of an observer in a corresponding raster and modulating the brightness of the source with a signal derived from the detector output.

Thermal imaging devices to which the invention may be applied are described in U.S. Pat. No. 3,626,091 and in published European Patent Application Nos. 0,051,894 and 0,052,395. In these thermal imaging devices, the scanner comprises a polygonal mirror prism having a plurality of planar mirrors arranged at a variety of tilt angles relative to an axis of rotation of the prism. Upon rotation of the prism, the planar mirrors pass through a scanning location where incoming thermal infrared radiation from a remote scene is reflected from each planar mirror in turn to pass through an objective which images the scene upon a linear array of infrared detectors. Each planar mirror of the polygon scans a different band of the scene transversely across the length of the array. Each detector is coupled to modulate one of a corresponding linear array of light sources. The light sources are viewed by reflection in the planar mirrors as they pass through a reconstruction location separated from the scanning location around the prism. The sequence of mirror tilt angles around the prism is chosen in relation to the separation of the scanning and reconstruction locations around the prism so that a correctly reconstructed image is presented to an observer.

British Patent Specification No. 1,442,195 describes a thermal imaging system in which the visible picture is reconstructed on the face of a cathode ray tube. In addition to modulating the electron beam of the cathode ray tube, the output of the single infrared detector is digitized at intervals in the raster and stored in a digital memory for comparison with the corresponding values of a laser raster. If the difference in detector outputs at corresponding points in the two rasters exceeds a threshold value corresponding to an undesirably rapid change in temperature at that point in the scene, an alarm is raised. There is, however, no measurement of the temperature at any point in the scene.

Radiation pyrometers for measuring of the temperatures of remote targets are known in which a controllable internal radiation reference source is used. Radiation from the reference source is compared with radiation from the target by an infrared detector by means of a chopper. The chopper switches the field of view of the detector alternately between the target and the reference source. The detector output is then a difference signal which, via a phase sensitive rectifier and an amplifier, is used to control the radiation output of the reference source so that the radiation received from the reference source and the target are equal. The temperature of the reference souce, or alternatively the power energizing the reference source, may then be taken as a measure of target temperature, due allowance being made for the emissivity of the target. Such a radiometer is described in Mullard Technical Note No. 79 (TP 1664) published in March of 1978.

SUMMARY OF THE INVENTION

According to the present invention there is provided apparatus for measuring the temperature of a target. The apparatus comprises an objective lens for forming a thermal image of the target upon a thermal radiation detector of predetermined detectivity and spectral response. It also includes means for switching the field of view of the detector from the target to a reference temperature source. According to the invention, the apparatus further comprises means for sampling the detector output signal when the detector is viewing the target and for sampling the signal when the detector is switched to receive radiation from the reference temperature source, and means for computing the temperature of the target. The latter means comprises means for forming a difference signal between the sampled target and reference signals, means for deriving a reference signal which would have been obtained from the detector when switching from a body at absolute zero temperature to the reference source, means for dividing the difference signal by an assumed emissivity of the target, means for adding the quotient of the division to the calculated reference signal to form a calculated target signal, and means for calculating the target temperature as that black-body temperature which would have produced the calculated target signal as output from the detector when switching from a body at absolute zero temperature to the target.

Such apparatus may be a radiation pyrometer in which the switching means is of known form, the example a chopper blade which alternately exposes the detector to target or reference source radiation. However, if it is desired to measure the temperature of a target of small angular size, the field of view of the detector, via the objective lens, must also be of small angular size. With such a pyrometer it is assumed that the target has been identified by other means. But if it is desired to detect possible targets in an extended scene, it could be very time consuming to manually scan the narrow field of view of the pyrometer across the scene to identify targets whose temperature might be of interest. Therefore, it is of considerable interest for apparatus according to the invention to be thermal imaging apparatus, the detector of which is used to provide the signals for input to the calculation. In this case, the radiation switching means may comprise a scanner which scans the narrow field of view of the detector across the target and the adjacent thermal scene and also across a temperature reference source.

Thus, the invention also provides thermal imaging apparatus comprising an objective lens for forming an image of a thermal scene, and a scanner for repetitively scanning a thermal radiation detector of predetermined detectivity and spectral response relative to the image in a raster. Reconstruction means produces a visible version of the scene by synchronously scanning a light source across the field of view of an observer in a corresponding visible raster, and modulates the brightness of the source with a signal derived from the detector output. The apparatus is also adapted to measure the temperature of a target in the thermal scene. For the purpose it comprises means for sampling the detector output signal at a predetermined point in the raster when the detector is aligned with the target, and for sampling the signal at a point outside the raster when the detector is receiving radiation from a reference temperature source. Temperature calculations are performed by means for forming a difference signal between the sampled target and reference signals, means for deriving a reference signal which would have been obtained from the detector when scanning from a body at absolute zero temperature to the reference source, means for dividing the difference signal by an assumed emissivity of the target, means for adding the quotient of the division to the calculated reference signal to form a calculated target signal, and means for calculating the target temperature at that black-body temperature which would have produced the calculated target signal as output from the detector when scanning from a body at absolute zero temperature to the target. For convenience in aligning the predetermined point in the scanning raster with a selected target as seen in the imager, means may be provided to render visible the point in the visible raster corresponding to the predetermined point to act as an aiming point for a selected target.

The calculation of the temperature of a target according to the invention involves evaluating radiation integrals taking into account the parameters of the detector and of the optical system. Such calculations would presently involve excessive computing capacity within the apparatus. Preferably therefore the means for calculating the temperature may comprise a microprocessor wherein the relationships between the reference source temperature and the calculated reference signal and between the calculated target signal and the target temperature are stored as polynomial expressions having precalculated coefficients.

DESCRIPTION OF THE PREFERRED EMBODIMENTS

Figure 1:
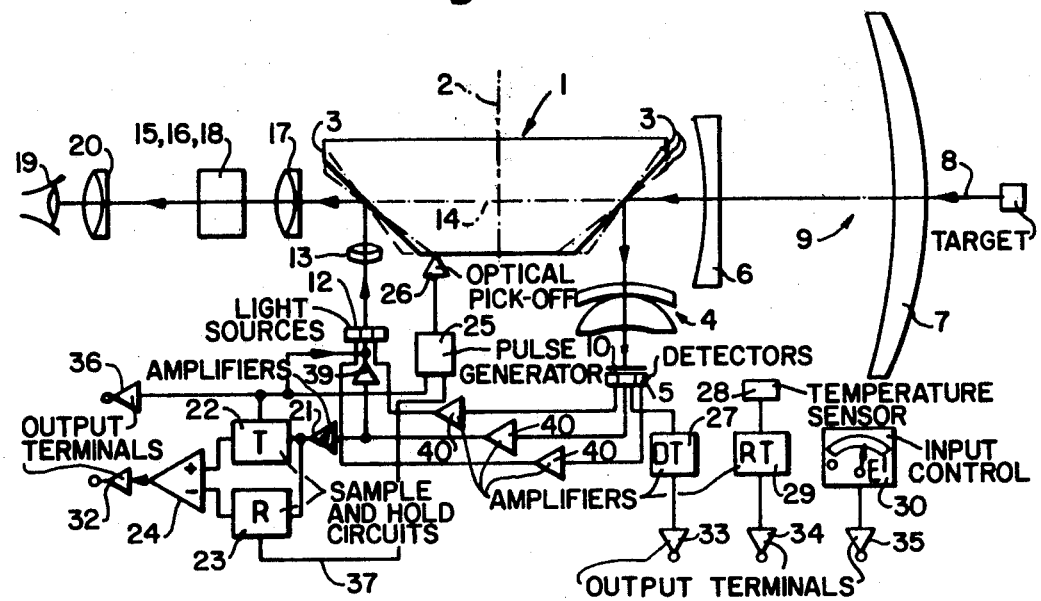
FIGS. 1 and 2 show schematic elevation and plan views, respectively, of a thermal imaging apparatus employing a 9-sided mirror prism.
Figure 2:
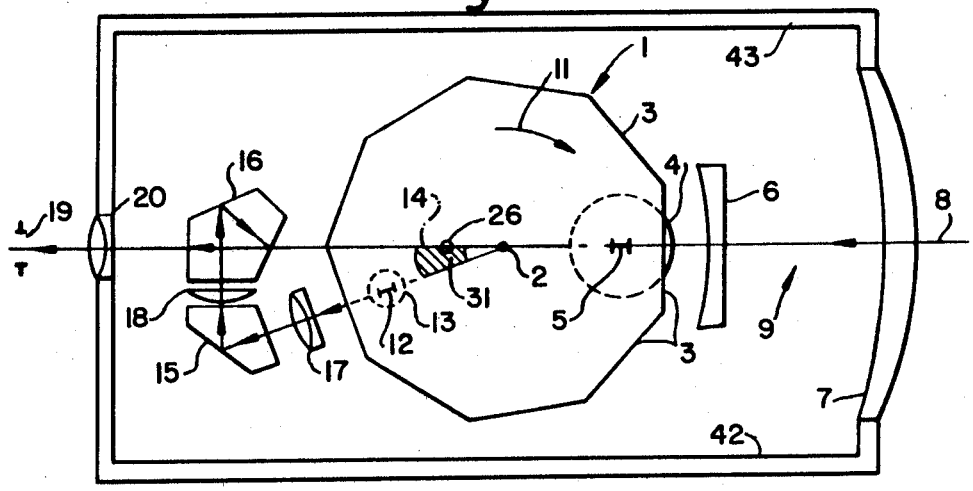

In FIGS. 1 and 2 the chief ray 8 of a beam of infrared radiation is shown entering the apparatus from a point in the scene in the center of the field of view. An afocal Galilean telescope 9 may be employed to provide scene magnification by a factor of between 2 and 3. The telescope comprises a positive silicon lens 7 and a negative germanium lens 6 as described in British Patent Specification No. 1,530,066.

After passing through telescope 9, the beam of infrared radiation is reflected by a planar mirror 3 of a rotatable mirror prism 1 to be substantially parallel to the axis of rotation 2 of the mirror prism. An objective lens 4 at a scanning location forms an image 10 of the scene in the plane of a linear array of infrared detectors 5 aligned along a radius extending from the axis of rotation 2. Rotation 11 of the prism about axis 2 causes the image 10 to be moved transversely across the length of the linear array 5, scanning a band of lines in the image 10.

The mirror prism 1 has nine planar mirrors 3 set at equal angles about the axis 2 so that any cross-section through the prism normal to axis 2 is an equiangular polygon. In particular, the section through the centers of mirrors 3 is the regular polygon of FIG. 2. The mirrors 3 are generally set at an angle of 45 degrees to axis 2, though each mirror 3 has a small additional angle of tilt away from 45 degrees, which additional angle is different for each mirror 3. The difference in tilt angle between any two mirrors 3 is an integral multiple of half the angular length of the linear array 5. The angular length of the array is linear length of the array divided by the focal length of the objective lens 4. Thus between the scans produced by two mirrors 3 having a tilt difference equal to half the angular length, the image 10 is shifted along the array 5 by the length of the array so that the bands in the image 10 scanned by these two mirrors are contiguous.

To reconstruct a visible version of the scene, a linear array of light sources 12, aligned along a radius extending from the axis of rotation 2, is provided at a reconstruction location. The light sources 12 are each coupled, by an amplifier 40, to a corresponding detector in the detector array 5. For simplicity in FIG. 1 only three detectors, three amplifiers, and three sources are shown.

Each light source in array 12 produces a light output modulated in response to the radiation received by the corresponding detector. Lens 13 collimates light beams from the sources substantially parallel to axis 2 and directs them onto the face of a mirror 3. Lens 13 also presents the array 12 to the viewing optics at an angular length equal to that of the array 5 so that the reconstructed visible bands are contiguous. Further details of the optical arrangements are described in European Patent Application No. 0,051,894 incorporated herein by reference.

In FIG. 1, the center detector of the array 5 is selected for making radiometric temperature measurement of the target. The output of this detector is only used for temperature measurement in one of the nine bands of the scanned scene. An optical pick-off 26 cooperates with a nonreflective sector 31 (FIG. 2) fixed on a surface of the mirror prism which is otherwise reflective. The angle of the sector is 20°, being half the angle between adjacent mirrors 3 of 40°.

One radial edge of the sector is aligned in relation to the mirror 3 which scans the selected band in the scene, so that there is a change in pick-off output as the selected mirror 3 passes through the center of its scan. A reverse change in pick-off output occurs at the other radial edge of sector 31 when two adjacent mirrors 3 are reflecting radiation from the inside of the equipment casing 43 into the objective lens 4 and onto the detector. This effectively switches the field of view of the detector from the target to the casing interior wall 42 blackened to act as a reference temperature source.

The temperature of the casing interior is sensed by a solid state temperature sensor 28, type number AD 590, which provides a current output of 1 $\mu$amp per degree Kelvin. Amplifier 29 processes sensor 28 output to provide a d.c. output voltage 34 of zero at $+20°$ C. and which ranges from $+2$ volts of 40° C. to $-2$ volts at 0° C.

Pulse generator 25 processes the output of pick-off 26 to provide a first sampling pulse in the scene center on output 36 and a second sampling pulse on conductor 37 when the center detector of array 5 is exposed to reference radiation. The first sampling pulse is also fed to modulate the center light source of array 12 corresponding to the center detector of array 5 to provide an aiming point for the target. A buffer amplifier 39 prevents feedback of the sampling pulse into the detector output used for sampling.

The output of the amplifier 40, a.c.-coupled to the center detector is fed via a variable gain amplifier 21 to sample-and-hold circuits 22 and 23. The gain of amplifier 21 is adjusted to compensate for three separate factors when the apparatus is calibrated. Firstly, the photoconductive detectors used have a long wavelength cut-off which can vary between 5.0 microns and 4.6 microns for different samples of detector and which gives a decrease of signal from ambient temperature targets of some 63%. Over this wavelength range, however, the gain change is linear and can be compensated by a corresponding amplifier gain change. Secondly, the transmission of the infrared optics will vary from sample to sample, producing a straightforward attenuation factor. Thirdly, the peak detector responsivities vary from sample to sample, likewise producing a simple gain change. In practice, the gain at amplifier 21 can be preset on calibration with a target of unity emissivity at a known temperature to give an equal indicated temperature.

Sample-and-hold circuit 22 samples the value of the output signal of amplifier 21 at the instant a pulse appears at output 36 and holds the value until the next sample which will occur after one complete turn of the mirror prism in 40 msec at a framing rate of 25 pictures per second. Likewise, sample-and-hold circuit 23 samples the output of amplifier 21 when the detector is receiving reference radiation. Subtractor 24 provides an output at terminal 32 of the difference signal between the target and the reference source.

When calculating the target temperature, the difference signal must be scaled to take account of the fact that the peak detectivity of the detector is a function of the temperature to which it is cooled. Presently, the cooling is provided by a thermoelectric cooler fed with a constant current. The detector temperature obtained depends on the temperature of the hot side of the cooler which rejects heat to the exterior. This hot side temperature in turn depends largely upon the surrounding air temperature. In practice, there is a 1% change in detectivity per degree Centigrade change in detector temperature.

The temperature of the detector substrate is sensed by a transistor (not shown) (Mullard Type BC109) in which the base-emitter junction is connected as a diode. The reverse bias voltage of this diode is a function of temperature, being 800 mV at $-80°$ C. After processing in amplifier 27 an output on terminal 33 is provided which is zero volts d.c. at $-73°$ C. and has a scale factor of 1 volt per $20°$ C. rise in temperature. The nonlinear relationship between detectivity and temperature is stored in a microprocessor, to be described later, which carries out the temperature calculation.

An estimate must be made by the observer of the emissivity $\epsilon$ of the target for input to the calculation. The value of $\epsilon$ is required not only to allow for the effect on the radiation emitted by the target by virtue of its own temperature only, but also to allow for the amount of radiation emitted by the target's surroundings and which falls upon the target and is reflected by it. It has been found that the best assumption that can be made is that the target's surroundings are a black body and that they are at the same temperature as the reference source in the apparatus. In many practical applications, particularly within enclosed spaces, this assumption is close to reality.

The radiometric situation which exists at the target can then be summarized as follows.

Let $E_t$ = total radiant energy output by the target at temperature t, $E_t^{bb}$ = radiant energy emitted by a black body at temperature t, and $E_{ref}^{bb}$ = radiant energy emitted by a black body at the temperature of the surroundings assumed to equal the reference source temperature.

Then, $$E_t = \epsilon E_t^{bb} + (1-\epsilon)E_{ref}^{bb} \tag{1}$$

$(1-\epsilon)$ being the target reflectivity. In the apparatus, the detector can usually only provide, in conjunction with the sampling means and the radiation switching means, a signal proportional to the difference, $E_\Delta^{bb}$, between the total energy output by the target and that emitted by the reference source.

Then $$E_\Delta^{bb} = E_t - E_{ref}^{bb}.$$

Using equation (1), this becomes:

$$E_\Delta^{bb} = \epsilon E_t^{bb} + (1-\epsilon)E_{ref}^{bb} - E_{ref}^{bb}$$

which simplifies to:

$$E_\Delta^{bb} = \epsilon(E_t^{bb} - E_{ref}^{bb})$$

from which $$E_t^{bb} = E_\Delta^{bb}/\epsilon + E_{ref}^{bb}$$

Thus, in terms of the detector signal, if the difference signal is divided by the assumed target emissivity and the quotient added to the calculated signal which would have been produced by the detector when exposed to a radiation change equal to the total energy radiated by the reference source, a signal is obtained which would have been produced by the detector when exposed to a radiation change equal to the total energy radiated by a black body at the target temperature. From the value of $E_t^{bb}$ thereby obtained, a calculation can be made of the black body temperature which would have given this value, that is, the temperature of the target.

An input control 30, for example a potentiometer, is provided for the emissivity which provides a D.C. voltage output on terminal 35 with a suitable scaling factor. In practice, the observer may measure the temperature of a body at a known temperature and which has the same emissivity as the target, and adjust the emissivity control until the measured temperature equals the known temperature. This effectively uses the apparatus to measure emissivity.

Figure 3:
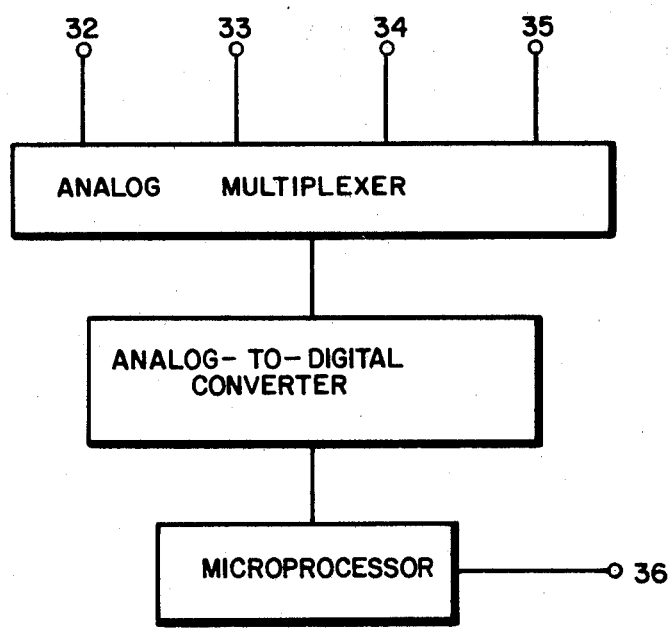
FIG. 3 is a schematic diagram of a means for calculating the target temperature in a thermal imaging apparatus according to the invention.

The calculation of temperature is carried out in a microprocessor. As shown in FIG. 3, the output terminals 32, 33, 34 and 35 are connected in turn via an analog multiplexer to an analog-to-digital converter. The digitized values of difference signal, detector temperature, casing or reference temperature and the assumed emissivity, respectively, are then loaded into separate store locations in the microprocessor. The sampling pulse on terminal 36 is also fed to the microprocessor to provide an indication when a revised value of difference signal is available. Before the calculation is carried out, an average value of the preceding 25 values of the difference signal is calculated for subsequent use. This reduces the errors due to small random motion of the aiming point relative to the target and to noise on the difference signal before sampling.

The first part of the calculation is to determine the reference signal which would have been obtained from the detector in scanning from a body at absolute zero temperature to the reference source. Then, the difference signal obtained when scanning from the reference source to the target is corrected for target emissivity and added to the reference signal to obtain a calculated target signal. The target temperature is then calculated as that black body temperature which would have produced the calculated target signal as output from the detector when scanning from a body at absolute zero temperature onto the target.

Calculating the reference signal involves evaluating the radiation integral over the wavelength range from $3\mu$ to $4.8\mu$, taking into account the detector spectral response and the transmission of the optical system. To reduce the size of the microprocessor used in the apparatus, the integral is evaluated on a more powerful computing facility for a number of temperatures over the expected range of reference source temperatures, to provide a set of precalculated reference signals. A third order polynomial is then fitted to these points in the form:

$$V_{ref} = A_1 T^3 + B_1 T^2 + C_1 T + D_1$$

where $V_{ref}$ is the reference signal obtained at a reference temperature of T°C., $A_1$, $B_1$, $C_1$ and $D_1$ being numerical constants. The polynomial constants are stored in the apparatus microprocessor and enable the reference signal to be calculated given a reference temperature output from terminal 34.

In a like manner, the radiation integral is evaluated for a number of points, for example 30, in the expected target temperature range, for example 0° C. to +90° C. A seventh order polynomial is then fitted to these points in the form:

$$T_t = A_2 V^7 + B_2 V^6 + C_2 V^5 + \ldots + G_2 V + H_2$$

where $T_t$ is the target temperature in degrees Centigrade and V is the calculated target signal, $A_2$ to $H_2$ being numerical constants. These polynomial constants are stored in the apparatus microprocessor and enable the target temperature to be calculated given the calculated target signal.

The above embodiment describes the invention applied to thermal imaging apparatus. The invention may also be applied to radiation pyrometers in which the objective lens focuses the target radiation onto the detector without scanning motion. A chopper is then used as the switching means to expose the detector alternately to target radiation or to reference source radiation. The detector output is sampled synchronously with the chopper motion thereby providing the signals needed as input to the calculation. A visual sight is provided on the pyrometer aligned with the detector field of view to allow an operator to align the pyrometer with a selected target.

I claim:

1. An apparatus for measuring the temperature of a target, said apparatus comprising:

a thermal radiation detector having a predetermined detectivity and spectral response, and capable of producing an output signal;

means for alternately forming a thermal image of the target on the detector and a thermal image of a reference temperature source on the detector;

means for sampling the detector output signal when the target image is formed on the detector to produce a target signal, and for sampling the detector output signal when the reference source image is on the detector to produce a measured reference signal;

means for forming a difference signal which is equal to the difference between the target signal and the measured reference signal;

means for calculating a calculated reference signal which is equal to a signal which would be obtained from the detector by forming a thermal image of the reference source on the detector after forming a thermal image of a body at a temperature of absolute zero on the detector;

means for producing a quotient signal by dividing the difference signal by an assumed emissivity of the target;

means for producing a calculated target signal by adding the quotient signal to the calculated reference signal; and means for calculating the target temperature as that black body temperature which would produce the calculated target signal from the detector by forming a thermal image of the black body on the detector after forming a thermal image of a body at a temperature of absolute zero on the detector.

2. An apparatus as claimed in claim 1, characterized in that the sampling means comprises a first sample and hold circuit for the target signal, and a second sample and hold circuit for the measured reference signal.

3. An apparatus as claimed in claim 2, characterized in that:

the apparatus further includes means for measuring the temperature of the reference source; and the means for calculating the calculated reference signal and the means for calculating the target temperature both comprise a microprocessor, the relationship between the temperature of the reference source and the calculated reference signal and the relationship between the calculated target signal and the target temperature each being stored in the microprocessor as a polynomial expression, each polynomial expression having precalculated coefficients.

4. An apparatus as claimed in claim 1, characterized in that:

the apparatus further includes means for measuring the temperature of the reference source; and the means for calculating the calculated reference signal and the means for calculating the target temperature both comprise a microprocessor, the relationship between the temperature of the reference source and the calculated reference signal and the relationship between the calculated target signal and the target temperature each being stored in the microprocessor as a polynomial expression, each polynomial expression having precalculated coefficients.

5. A thermal imaging apparatus for forming a visible image of a thermal scene, and for measuring the temperature of a target in the scene, said apparatus comprising:

a thermal radiation detector having a predetermined detectivity and spectral response, and capable of producing an output signal;

means for forming a thermal image of the thermal scene;

means for repetitively scanning the thermal image of the thermal scene across the detector;

a light source;

means for repetitively scanning an image of the light source across the field of view of an observer, said light source scanning being in synchronism with and corresponding to the scanning of the thermal scene across the detector; and means for modulating the brightness of the light source with a signal derived from the detector output signal;

characterized in that the apparatus further comprises:

means for alternately forming a thermal image of the target on the detector and a thermal image of a reference temperature source on the detector;

means for sampling the detector output signal when the target image is formed on the detector to produce a target signal, and for sampling the detector output signal when the reference source image is on the detector to produce a measured reference signal;

means for forming a difference signal which is equal to the difference between the target signal and the measured reference signal;

means for calculating a calculated reference signal which is equal to a signal which would be obtained from the detector by forming a thermal image of the reference source on the detector after forming a thermal image of a body at a temperature of absolute zero on the detector;

means for producing a quotient signal by dividing the difference signal by an assumed emissivity of the target;

means for producing a calculated target signal by adding the quotient signal to the calculated reference signal; and means for calculating the target temperature as that black body temperature which would produce the calculated target signal from the detector by forming a thermal image of the black body on the detector after forming a thermal image of a body at a temperature of absolute zero on the detector.

6. A thermal imaging apparatus as claimed in claim 5, characterized in that the sampling means comprises a first sample and hold circuit for the target signal, and a second sample and hold circuit for the measured reference signal.

7. A thermal imaging apparatus as claimed in claim 6 characterized in that:

the apparatus further includes means for measuring the temperature of the reference source; and the means for calculating the calculated reference signal and the means for calculating the target temperature both comprise a microprocessor, the relationship between the temperature of the reference source and the calculated reference signal and the relationship between the calculated target signal and the target temperature each being stored in the microprocessor as a polynomial expression, each polynomial expression having precalculated coefficients.

8. A thermal imaging apparatus as claimed in claim 6, characterized in that the apparatus further comprises means for increasing the brightness of the light source when its image is scanned onto the location of the visible image of the target in the field of view of the observer.

9. An thermal imaging apparatus as claimed in claim 8, characterized in that:

the means for scanning the thermal image of the thermal scene and the means for scanning the image of the light source both comprise a polygonal mirror prism having an axis of rotation, said prism comprising a plurality of planar mirrors arranged at a variety of angles relative to the axis of rotation of the prism; and the apparatus further comprises:

a linear array of thermal radiation detectors capable of producing output signals, one of which detectors produces the target signal and the measured reference signal;

a linear array of light sources;

means for modulating the brightness of each light source with a signal derived from a corresponding detector output signal;

means for generating a pulse when the prism is rotated into a position where the target image is formed on the detector which produces the target signal and the reference signal; and means for applying the pulse to the first sample and hold circuit and for applying the pulse to the means for modulating the brightness of the light source which corresponds to the detector which produces the target signal and the reference signal.

10. A thermal imaging apparatus as claimed in claim 9, characterized in that:

the apparatus further includes means for measuring the temperature of the reference source; and the means for calculating the calculated reference signal and the means for calculating the target temperature both comprise a microprocessor, the relationship between the temperature of the reference source and the calculated reference signal and the relationship between the calculated target signal and the target temperature each being stored in the microprocessor as a polynomial expression, each polynomial expression having precalculated coefficients.

11. A thermal imaging apparatus as claimed in claim 8, characterized in that:

the apparatus further includes means for measuring the temperature of the reference source; and the means for calculating the calculated reference signal and the means for calculating the target temperature both comprise a microprocessor, the relationship between the temperature of the reference source and the calculated reference signal and the relationship between the calculated target signal and the target temperature each being stored in the microprocessor as a polynomial expression, each polynomial expression having precalculated coefficients.

12. A thermal imaging apparatus as claimed in claim 5, characterized in that the apparatus further comprises means for increasing the brightness of the light source when its image is scanned onto the location of the visible image of the target in the field of view of the observer.

13. A thermal imaging apparatus as claimed in claim 12, characterized in that:

the means for scanning the thermal image of the thermal scene and the means for scanning the image of the light source both comprise a polygonal mirror prism having an axis of rotation, said prism comprising a plurality of planar mirrors arranged at a variety of angles relative to the axis of rotation of the prism; and the apparatus further comprises:

a linear array of thermal radiation detectors capable of producing output signals, one of which detectors produces the target signal and the measured reference signal;

a linear array of light sources;

means for modulating the brightness of each light source with a signal derived from a corresponding detector output signal;

means for generating a pulse when the prism is rotated into a position where the target image is formed on the detector which produces the target signal and the reference signal; and means for applying the pulse to the first sample and hold circuit and for applying the pulse to the means for modulating the brightness of the light source which corresponds to the detector which produces the target signal and the reference signal.

14. A thermal imaging apparatus as claimed in claim 5, characterized in that:

the apparatus further includes means for measuring the temperature of the reference source; and the means for calculating the calculated reference signal and the means for calculating the target temperature both comprise a microprocessor, the relationship between the temperature of the reference source and the calculated reference signal and the relationship between the calculated target signal and the target temperature each being stored in the microprocessor as a polynomial expression, each polynomial expression having precalculated coefficients.

* * * * *